(12) United States Patent
Yada et al.

(10) Patent No.: US 7,677,494 B2
(45) Date of Patent: Mar. 16, 2010

(54) BOARDING RAMP DEVICE FOR AIRCRAFT

(75) Inventors: Wataru Yada, Saitama (JP); Hiroshi Yamanouchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 743 days.

(21) Appl. No.: 11/588,262

(22) Filed: Oct. 27, 2006

(65) Prior Publication Data

US 2008/0099605 A1 May 1, 2008

(51) Int. Cl.
*B64C 1/14* (2006.01)
*B64C 1/24* (2006.01)

(52) U.S. Cl. .................... 244/118.3; 14/71.1
(58) Field of Classification Search ............. 244/118.3, 244/129.5, 129.6, 137.2; 49/37; 414/137.1, 414/137.2; 296/61; 410/6, 93; 14/69.5, 14/71.1

See application file for complete search history.

(56) References Cited

U.S. PATENT DOCUMENTS 2,196,546 A * 4/1940 Bowers .................. 244/129.5
2,453,937 A * 11/1948 Ray ......................... 244/129.5
2,910,255 A   10/1959 Johnson
2,931,599 A * 4/1960 McQuilkin ............... 244/129.6
4,086,726 A   5/1978 Moses
4,453,684 A * 6/1984 Hanks ..................... 244/129.5

* cited by examiner

*Primary Examiner*—Rob Swiatek
(74) *Attorney, Agent, or Firm*—Birch, Stewart, Kolasch & Birch LLP (57) ABSTRACT

When a single door for opening and closing an opening in a body is opened outward with its lower part as a fulcrum, a plurality of plate-shaped steps of a foldable boarding ramp provided on an inner face of the door are swung in association with one another from a stored position along the inner face of the door to a deployed position to be used for ingress and egress of the passengers. Since the boarding ramp is folded into the stored position, it does not impair the space of a passenger compartment. Further, since the steps are folded into a position so as not to interfere with a window provided in an upper part of the door, they do not give an oppressed feeling to the passengers in the passenger compartment. The step is deployed to cover the window provided in the upper part of the door during use.

20 Claims, 9 Drawing Sheets

DOOR IN FULLY OPENED STATE

DOOR IN FULLY CLOSED STATE

FIG.9

BOARDING RAMP DEVICE FOR AIRCRAFT

BACKGROUND OF THE INVENTION

1. Field of the Invention

The present invention relates to a boarding ramp device for an aircraft wherein a single door is provided that includes a window in its upper part for opening and closing an opening in a body of the aircraft. The door is pivotally supported at its lower part by the body with a foldable boarding ramp being provided on an inner face of the door.

2. Description of Background Art

An aircraft such as a business passenger aircraft having a body of a relatively small diameter includes a boarding ramp on an inner face of a door (face opposed to a passenger compartment) in order to open and close an opening provided in a body for ingress and egress of passengers. U.S. Pat. No. 2,910,255 and U.S. Pat. No. 4,086,726 disclose a boarding ramp provided on an inner face of the door, wherein when the door that is pivotally supported at its lower end by the body is opened outwardly and an upper end of the door nears the ground, the ramp is diagonally positioned so as to connect the opening of the body to the ground.

However, the boarding ramp described in U.S. Pat. No. 2,910,255 and U.S. Pat. No. 4,086,726 projects into the passenger compartment from the inner face of the door in the state when the door is closed, leading to a problem that a space in the passenger compartment is oppressed. Also, the exposed boarding ramp impairs the appearance of the passenger compartment, leading to a possibility that the clothes of the passengers may be smeared with mud or the like adhering to the boarding ramp. Further, a window can not be provided in the door due to an obstruction by the boarding ramp. Thus, a problem results wherein the passengers have an oppressed feeling.

In this situation, Beechcraft SUPER KING AIR of Raytheon Aircraft Company employs a boarding ramp including a door pivotally supported at its lower end by an aircraft body with a plurality of steps swingably supported at their base ends by the inner face of the door. The steps are folded along the inner face of the door when the door is closed and the steps forms the boarding ramp by swinging into a deployed position when the door is opened.

The boarding ramp of SUPER KING AIR can effectively use the space of the passenger compartment since the steps can be folded, but does not yet solve the problems that the boarding ramp impairs the aesthetic appearance of the passenger compartment. In addition, the door does not have a window which leads to an oppressed feeling to the passengers.

SUMMARY OF THE INVENTION

An embodiment of the present invention provides a boarding ramp device for an aircraft which does not impair the space of a passenger compartment, has an excellent appearance, and does not give an oppressed feeling to passengers.

In order to achieve the above object, according to an embodiment of the present invention, there is provided a boarding ramp device for an aircraft wherein a single door includes a window in its upper part that opens and closes an opening in a body of the aircraft. The door is pivotally supported at its lower part by the body. A foldable boarding ramp is provided on an inner face of the door, wherein the boarding ramp includes a plurality of plate-shaped steps pivotally supported on the inner face of the door, wherein the steps are capable of swinging in association with one another between a stored position along the inner face of the door and a deployed position used for getting on and off by passengers. The steps are folded into the stored position so as not to interfere with the window, and the steps are deployed into the deployed position so as to cover the window.

With this arrangement, when the single door for opening and closing the opening in the body is opened outwardly with its lower part as a fulcrum, the plurality of plate-shaped steps of the foldable boarding ramp provided on the inner face of the door are swung in association with one another from the stored position along the inner face of the door to the deployed position used for getting on and off by passengers. Since the boarding ramp is folded into the stored position, they do not impair the space of the passenger compartment. In addition, since the steps are folded into the stored position where they do not interfere with the window provided in the upper part of the door, an oppressed feeling is not given to the passengers in the passenger compartment. Further, since the steps are deployed into the deployed position so as to cover the window provided in the upper part of the door, the passengers can step on the steps without being obstructed by the upper part of the door provided with the window.

According to an embodiment of the present invention, in addition to the first feature, the boarding ramp further includes a door handle pivotally supported by the body with a door driving link having one end pivotally supported by the door handle and the other end pivotally supported by the door. An upper-step driving link includes one end pivotally supported by the door driving link with an upper step having one end pivotally supported by the other end of the upper-step driving link and an intermediate part pivotally supported by the lower part of the door. A support link includes one end pivotally supported by the door and the other end pivotally supported by the upper step. An intermediate/lower-step driving link includes one end pivotally supported by the support link with a first gear rotatably supported at a rotational support point in the door with the other end of the intermediate/lower-step driving link is pivotally supported at a position eccentric from the rotational support point of the first gear. An intermediate step is pivotally supported by an intermediate part of the door with a second gear fixed to a support shaft of the intermediate step and meshed with the first gear and a first sprocket fixed to the support shaft of the intermediate step. A lower step is pivotally supported at a position below a lower end of the window provided in the upper part of the door. A second sprocket is fixed to a support shaft of the lower step with an endless chain wound around the first and second sprockets.

With this arrangement, since the door handle and the door are connected together by the door-driving link, the door can be opened and closed by operating the door handle. In addition, since the upper step is connected to the door-driving link through the upper-step driving link, the upper step can be swung between the stored position and the deployed position in association with the opening and closing of the door. Further, since the intermediate step is connected through the intermediate/lower-step driving link and the first and second gears to the support link connected to the upper step, and the intermediate step is connected to the lower step through the first and second sprockets and the endless chain, the intermediate step and the lower step can be swung between the stored position and the deployed position in association with the opening and closing of the door.

According to another embodiment of the present invention, the upper step includes an upper step inner part having one end pivotally supported by the door, and an upper step outer part having one end pivotally supported by the other end of the upper step inner part and the other end pivotally supported by the other end of the support link. The upper step inner part and the upper step outer part are folded so that they overlap with each other in the stored position.

With this arrangement, since the upper step is formed by the upper step inner part and the upper step outer part which are folded so that they overlap with each other in the stored position, the upper step can be further compactly stored.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
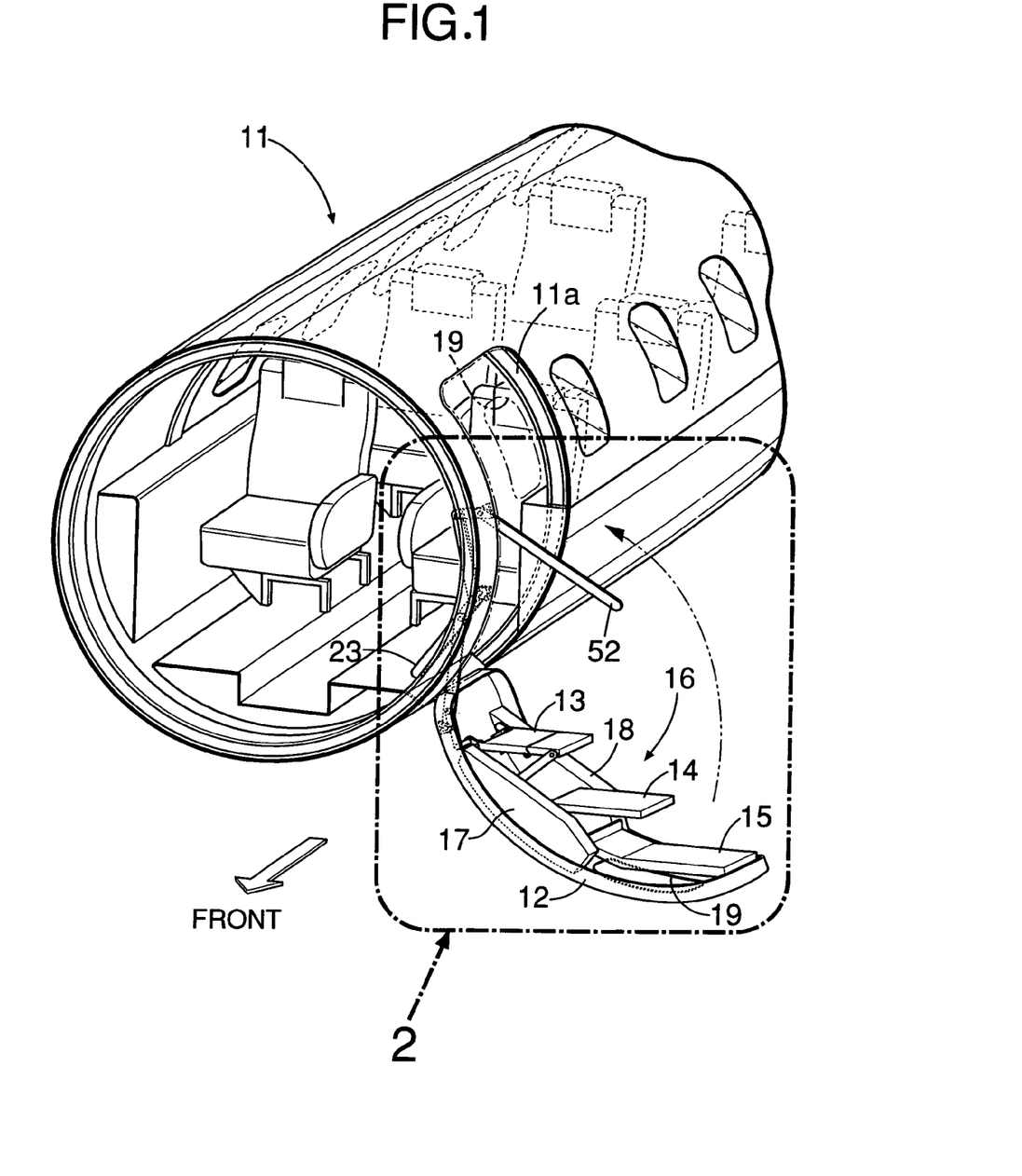
FIG. 1 is a partial perspective view of a front part of a body of an aircraft including a boarding ramp device according to an embodiment of the present invention.

Referring to FIG. 1, an opening 11a is formed on a left side face of a front part of a body 11 of an aircraft such as a business passenger aircraft, the opening 11a being opened and closed by a door 12 constituting a part of the body 11. A foldable boarding ramp 16 having an upper step 13, an intermediate step 14 and a lower step 15 are provided on an inner face of the door 12 (face opposed to a passenger compartment). A door front side pocket 17 and a door rear side pocket 18 for storing articles are provided on opposite front and rear edges of the door 12. The upper step 13, the intermediate step 14 and the lower step 15 of the boarding ramp 16 are deployed into a state available for getting on and off by passengers when the door 12 is fully opened and stored into a position along the inner face of the door 12 and between the door front side pocket 17 and the door rear side pocket 18 (see FIGS. 8 and 9).

In the specification, the "upper" and the "lower" in the door 12 are defined as the "upper" and the "lower" in a state where the door 12 is closed. Thus, a window 19 of the door 12 is provided at the upper part of the door 12, and a hinge line 20 (see FIG. 3) about which the door 12 is opened and closed is provided at the lower end of the door 12. However, the naming of the upper step 13, the intermediate step 14 and the lower step 15 are based on a state where the door 12 is opened, that is, the upper step 13 is provided at the lower part of the door 12, the intermediate step 14 at the intermediate part of the door 12 and the lower step 15 at the upper part of the door 12, respectively.

Figure 7:
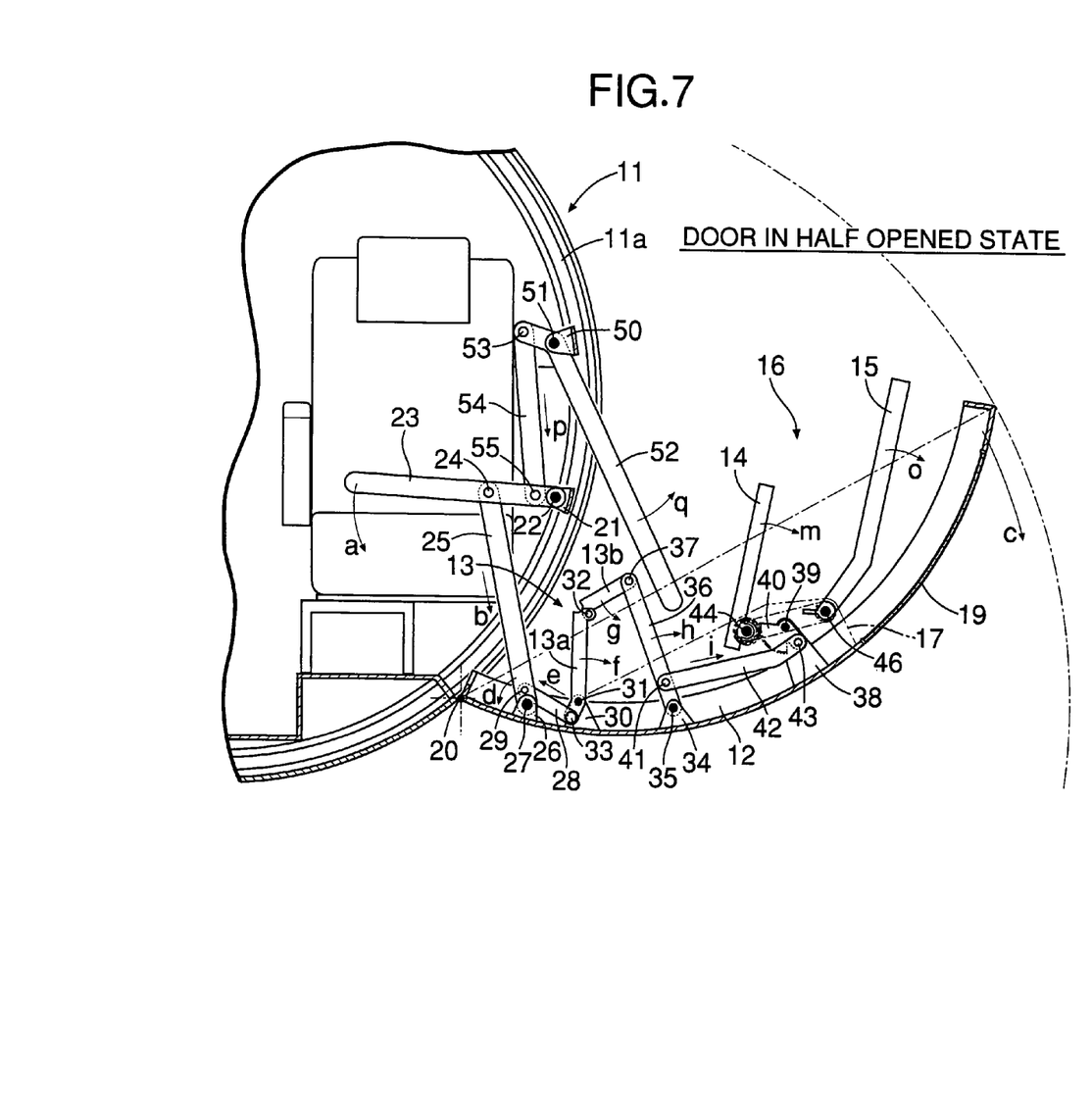
FIG. 7 is an action explanatory view corresponding to FIG. 3 (door in half opened state)
Figure 8:
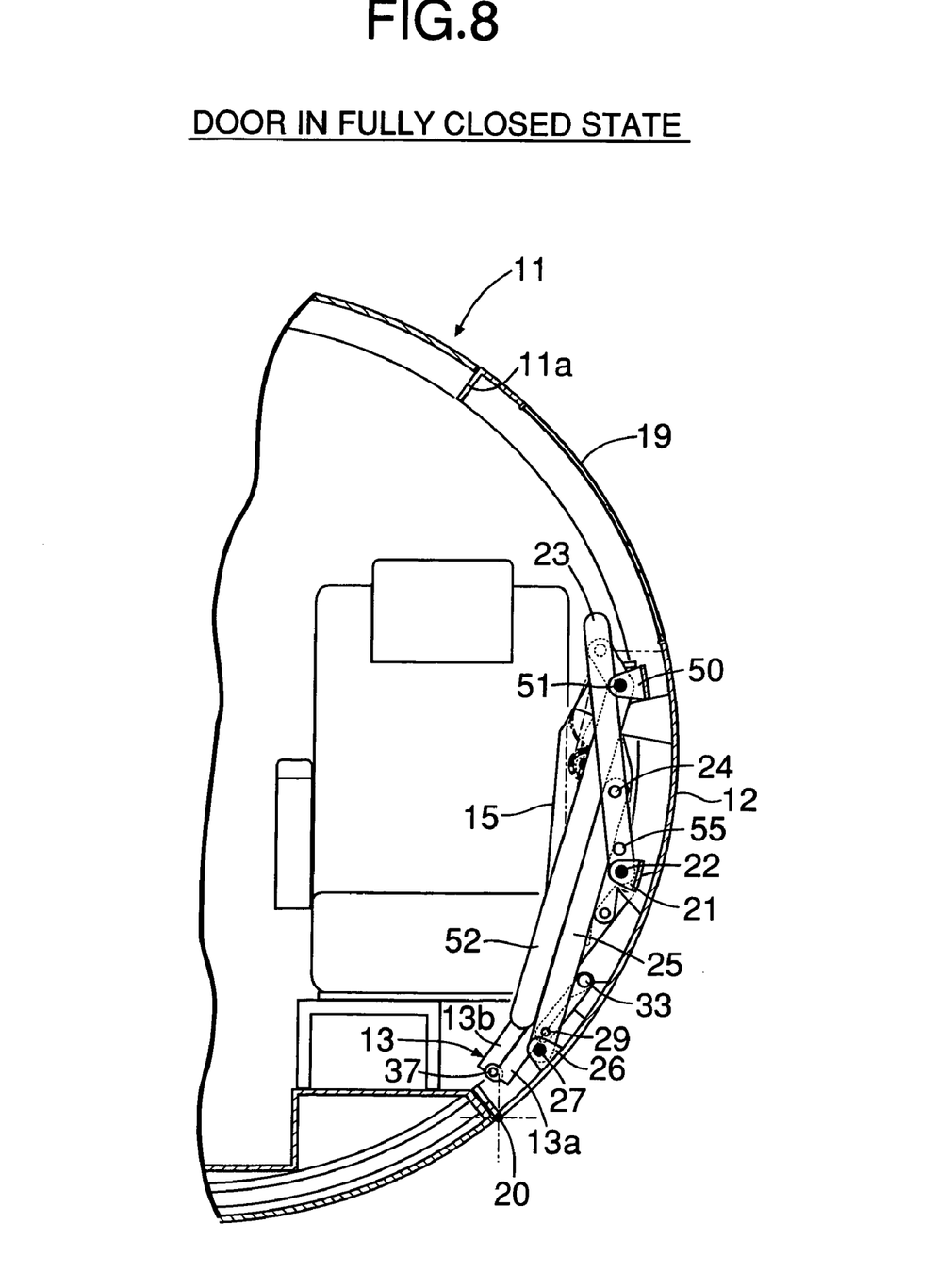
FIG. 8 is a view for explaining the operation corresponding to FIG. 3 (door in fully closed state)

Next, the structure of the boarding ramp 16 will be described with reference to FIGS. 2 to 6. In FIGS. 3, 7 and 8, black circles denote fulcrum pins which are unmovable with respect to the body 11 or the door 12, and white circles denote fulcrum pins which are movable with respect to the body 11 or the door 12.

One end of a door handle 23 is pivotally supported by a bracket 21 provided at the opening 11a of the door 12 through a fulcrum pin 22. A door driving link 25 is pivotally supported at its one end by the door handle 23. The other end of the door driving link 25 is pivotally supported through a fulcrum pin 27 by a bracket 26 provided on the inner face of the door 12. One end of an upper-step driving link 28 is pivotally supported through a fulcrum pin 29 at an intermediate part of the door driving link 25.

The upper step 13 comprises an upper step inner part 13a and an upper step outer part 13b. The upper step inner part 13a has one end pivotally supported through fulcrum pins 31, 31 by brackets 30, 30 provided on the inner face of the door 12. The upper step outer part 13b has one end pivotally supported through a fulcrum pin 32 by the other end of the upper step inner part 13a. A fulcrum pin 33 supports a portion of the upper step inner part 13a near its one end and the other end of the upper-step driving link 28. A support link 36 is pivotally supported at its one end by a bracket 34 provided on the inner face of the door 12 through a fulcrum pin 35. The other end of the support link 36 is pivotally supported by the other end of the upper step outer part 13b through a fulcrum pin 37.

Figure 2:
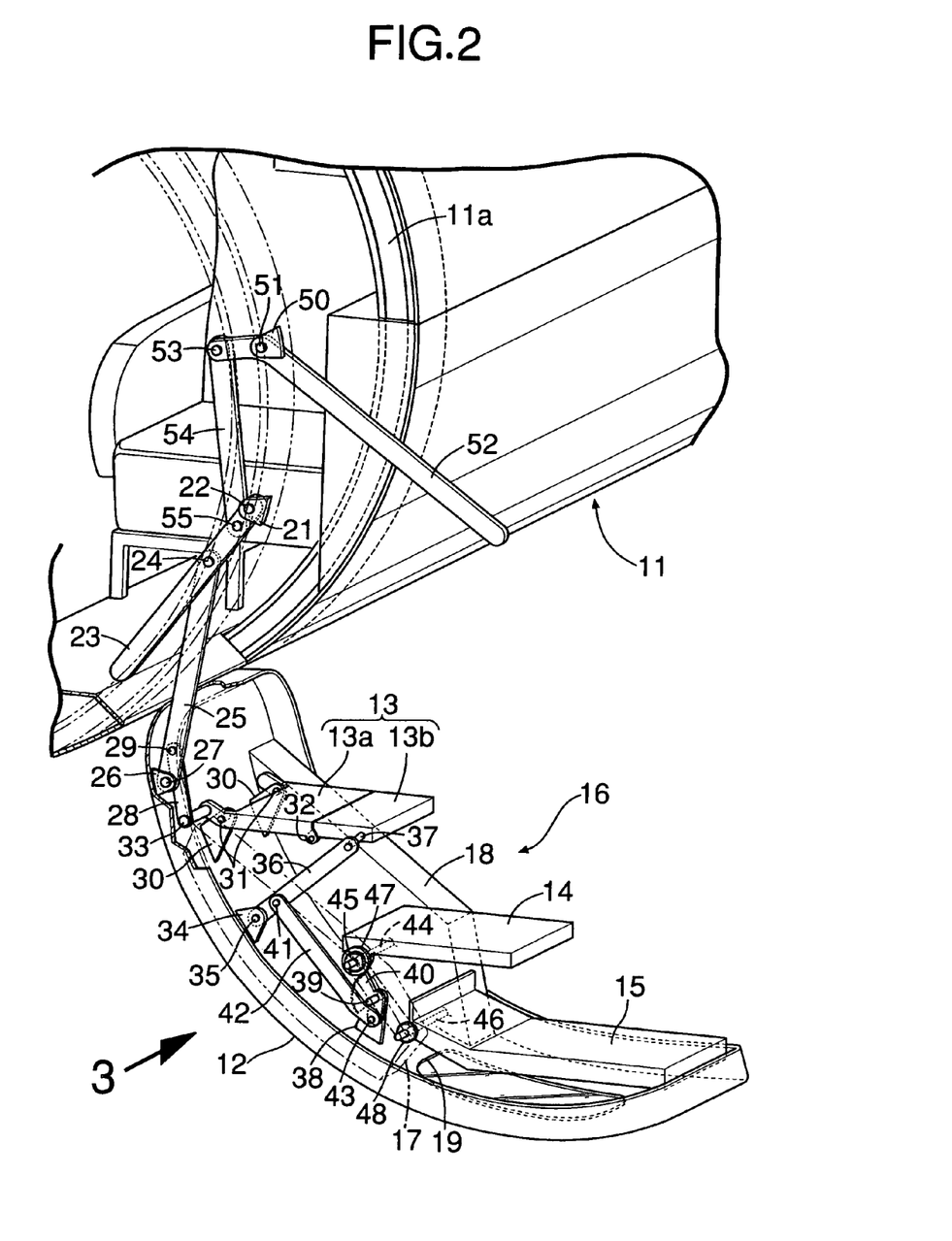
FIG. 2 is an enlarged view of Part 2 in FIG. 1.
Figure 3:
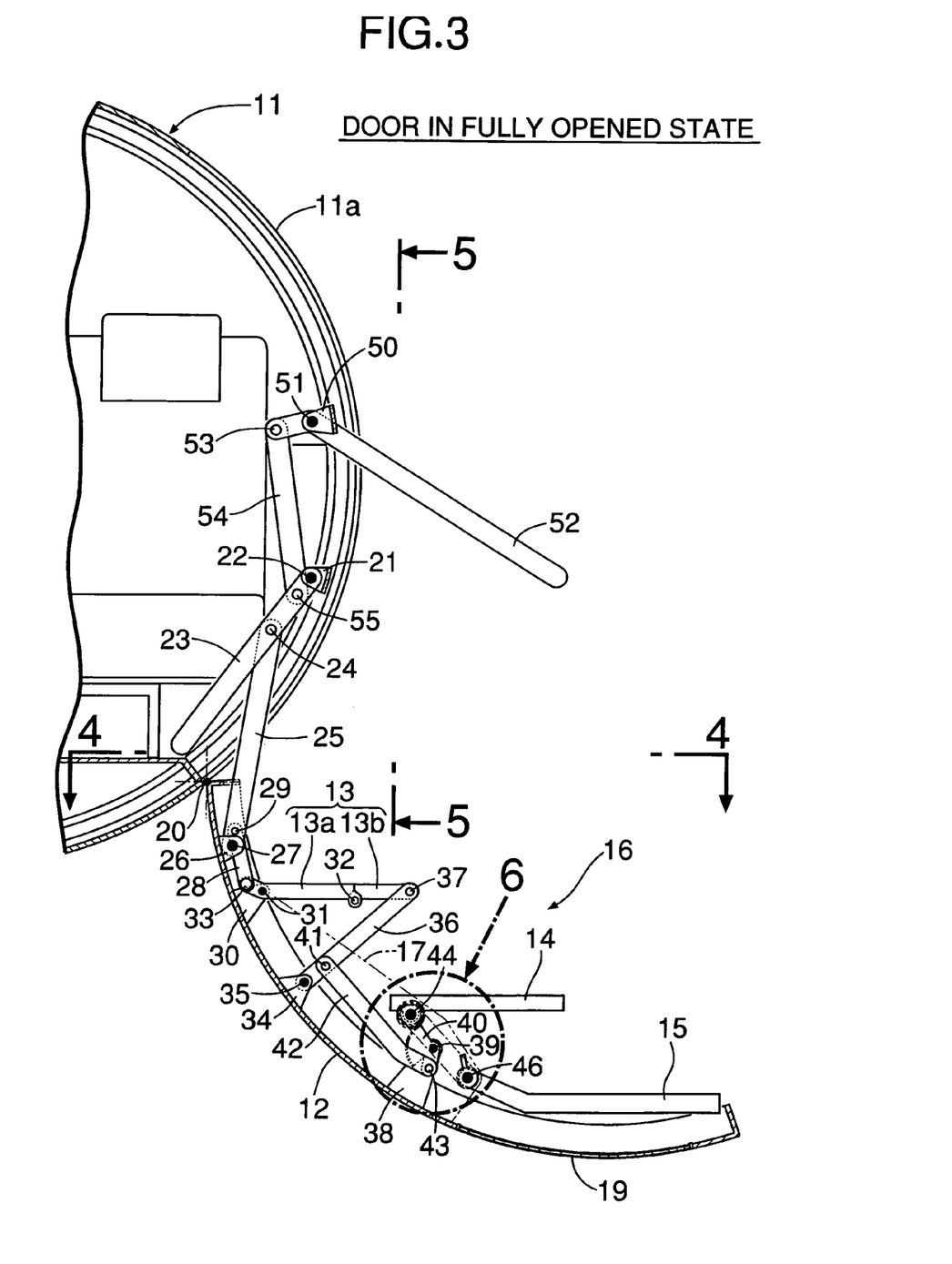
FIG. 3 is a view taken from Arrow 3 in FIG. 2 (door in fully opened state)
Figure 4:
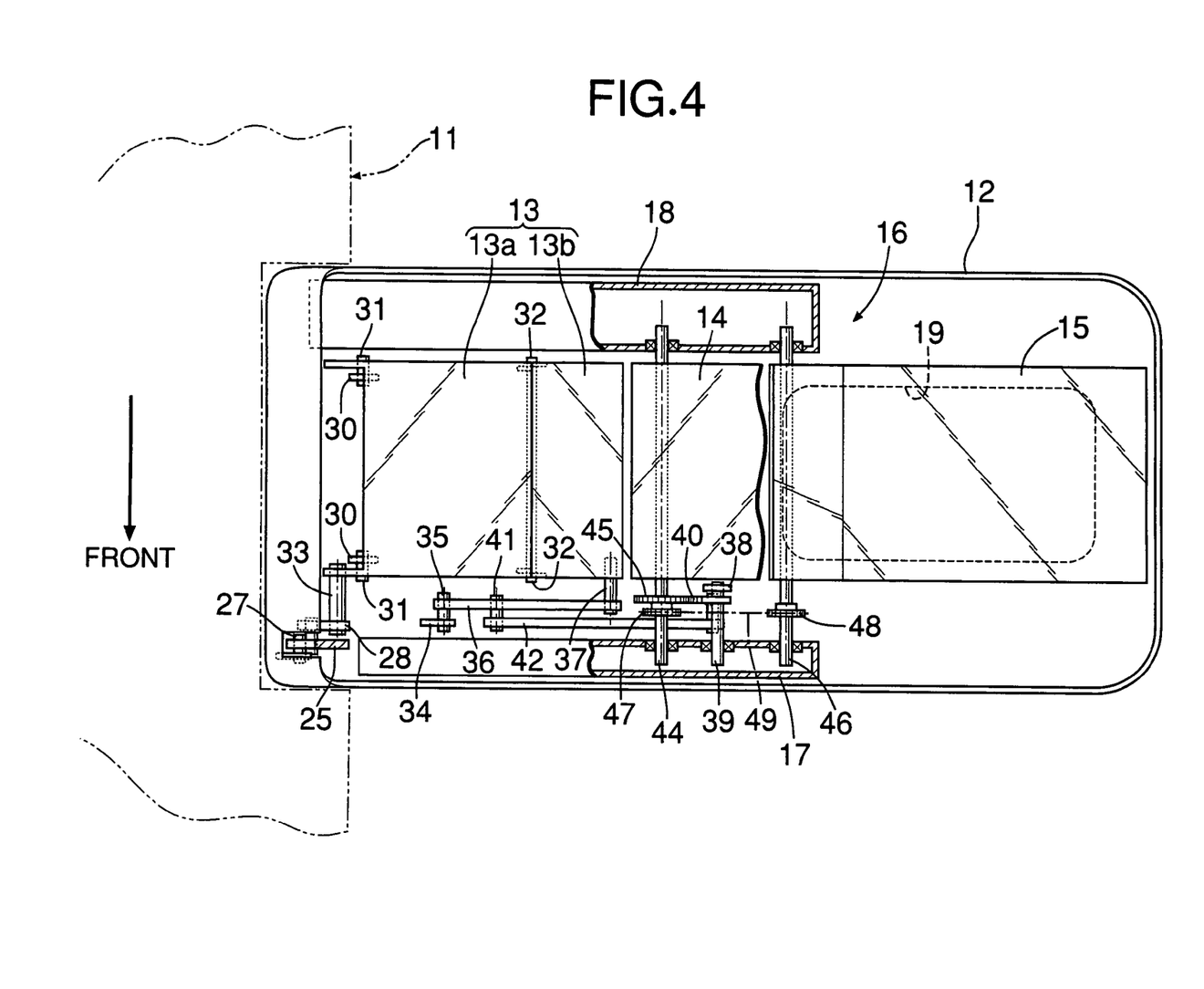
FIG. 4 is a view taken from an arrow of 4-4 line in FIG. 3.
Figure 5:
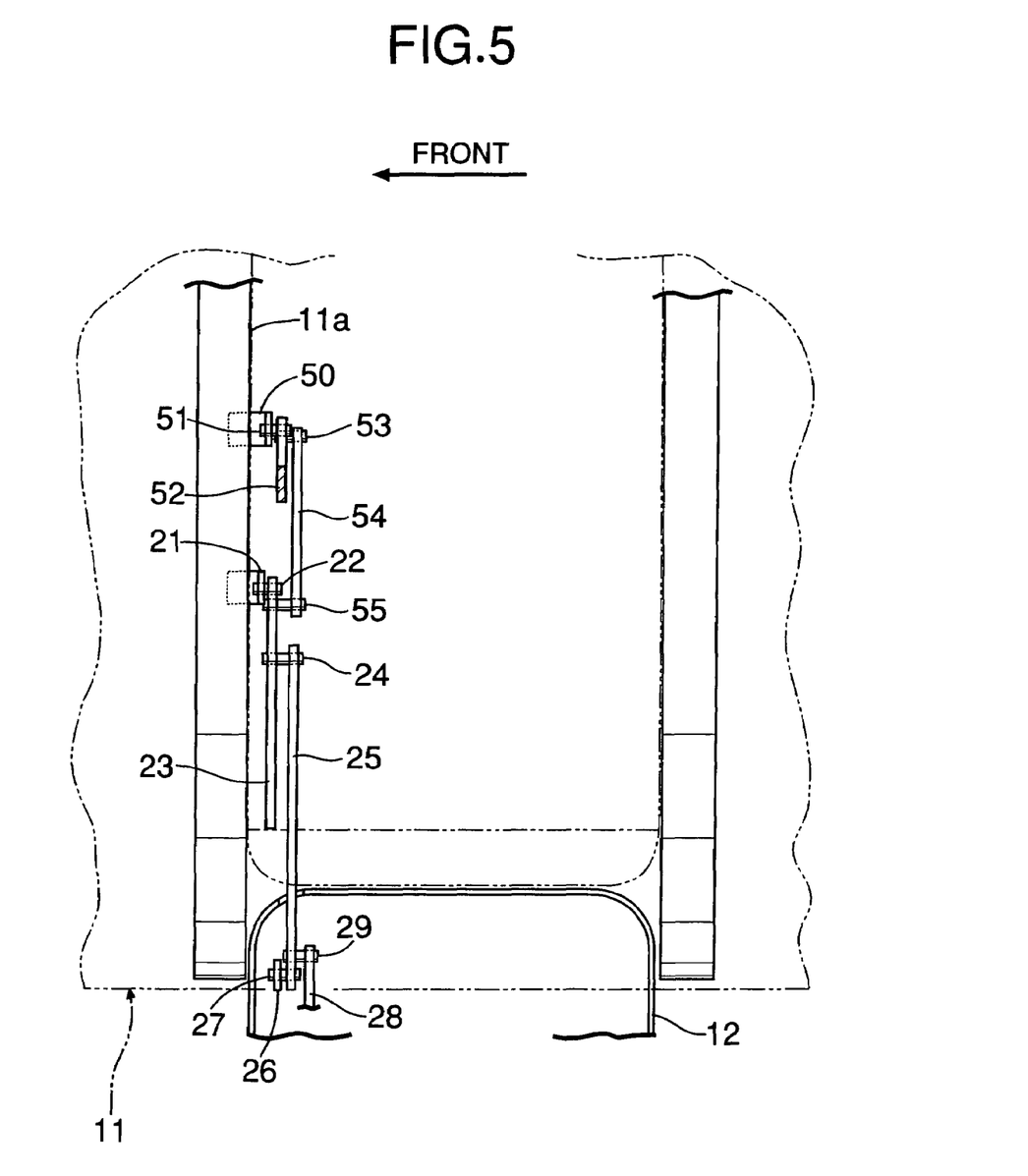
FIG. 5 is a view taken from an arrow of 5-5 line in FIG. 3.
Figure 6:
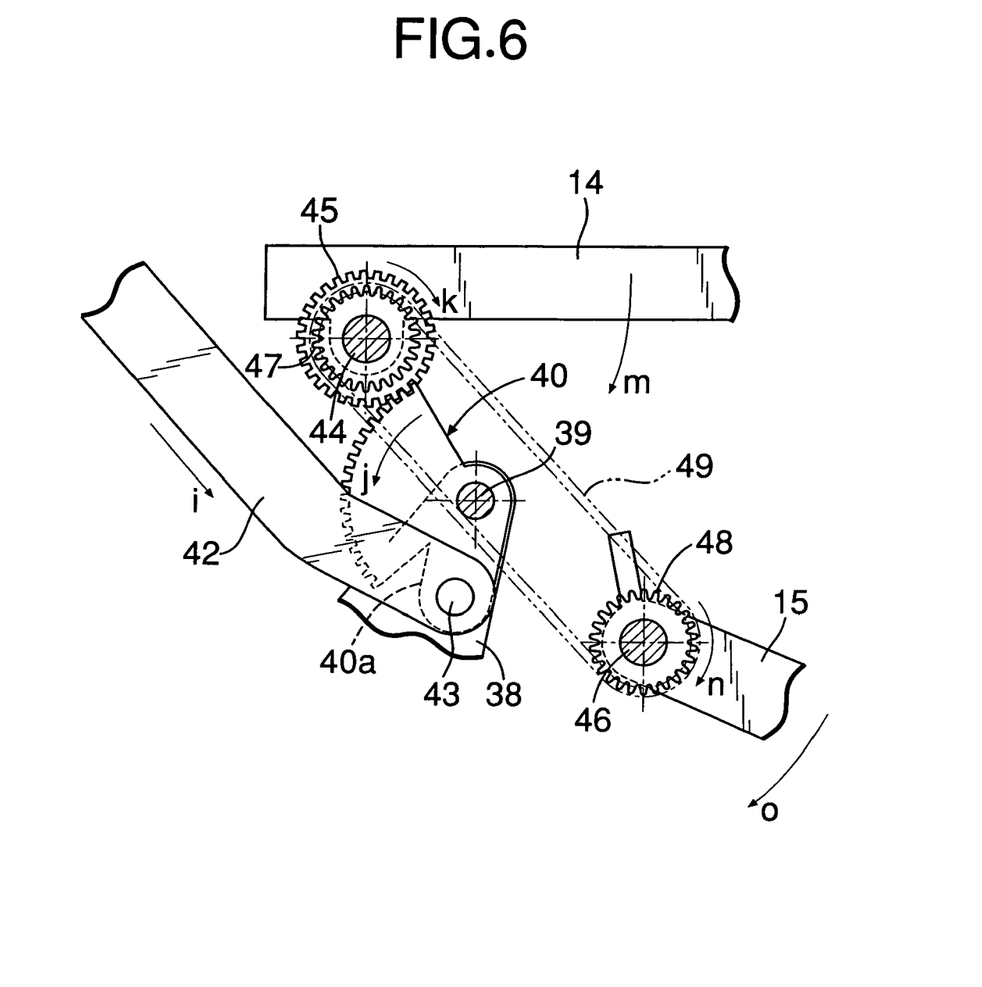
FIG. 6 is an enlarged view of Part 6 in FIG. 3.

As clearly shown in FIGS. 2 and 6, a first gear 40 includes a sector gear that is pivotally supported by a bracket 38 provided on the inner face of the door 12 through a fulcrum pin 39. An intermediate/lower-step driving link 42 is pivotally supported at its one end by the intermediate part of the support link 36 through a fulcrum pin 41. The other end of the intermediate/lower-step driving link 42 is pivotally supported through a fulcrum pin 43 at a tip end of an arm 40a extending from the first gear 40. One end of the intermediate step 14 is fixed to a first support shaft 44 bridging the door front side pocket 17 and the door rear side pocket 18. A second gear 45 is fixed to the first support shaft 44, and meshed with the first gear 40.

One end of the lower step 15 is fixed to a second support shaft 46 bridging the door front side pocket 17 and the door rear side pocket 18. An endless chain 49 is wound around a first sprocket 47 fixed to the first support shaft 44 and a second sprocket 48 fixed to the second support shaft 46.

An intermediate part of a handrail 52 is pivotally supported through a fulcrum pin 51 by a bracket 50 provided at the opening 11a of the door 12. A handrail driving link 54 is pivotally supported at its one end by one end of the handrail 52 through a fulcrum pin 53. The other end of the handrail driving link 54 is pivotally supported through the fulcrum pin 55 at the intermediate part of the door handle 23.

Next, the operation of the embodiment of the present invention having the above-described construction will be described.

Figure 9:
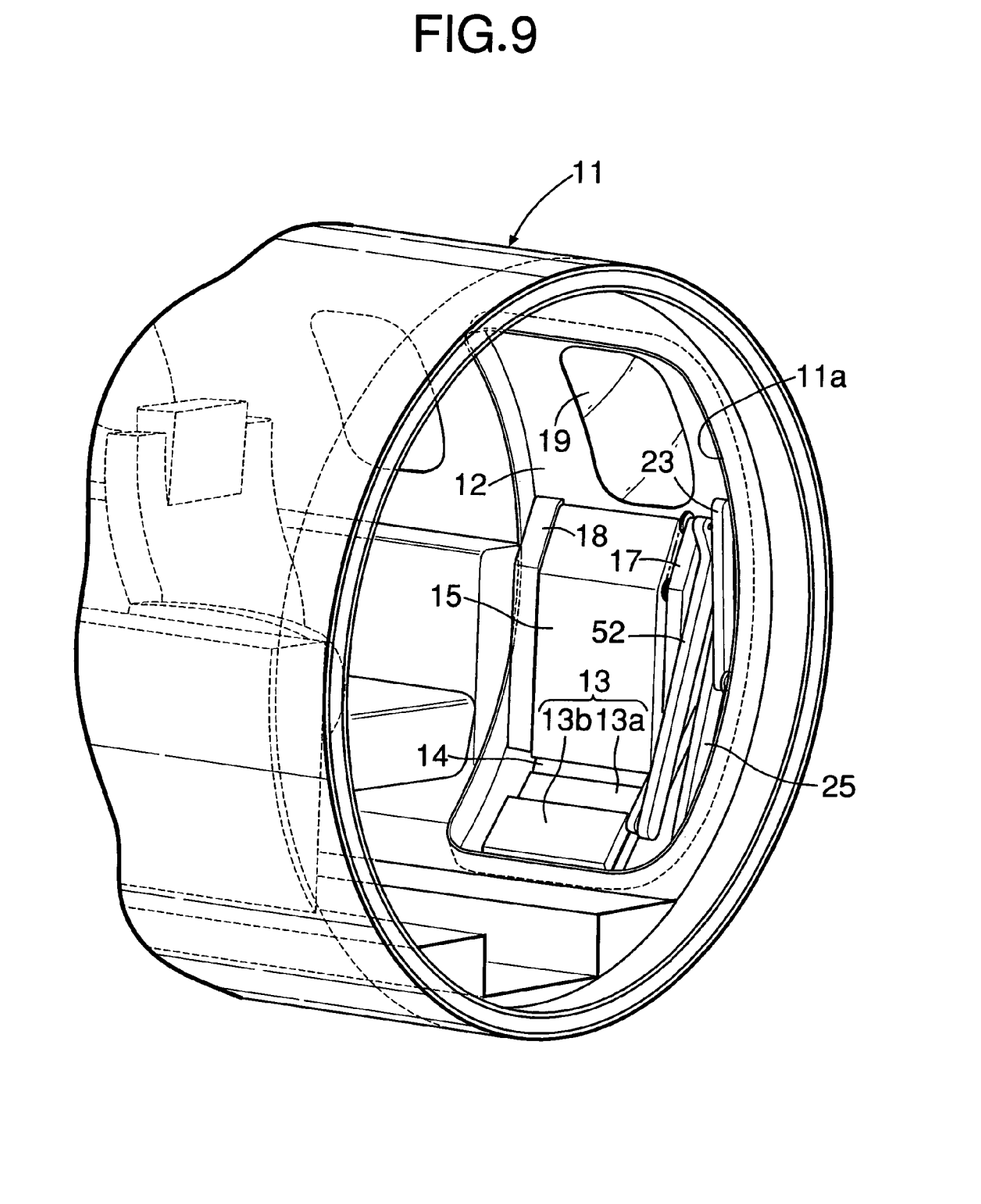
FIG. 9 is a perspective view showing an inner face of the door in the fully closed state.

As shown in FIGS. 8 and 9, when the door 12 is at the fully closed position where the door 12 closes the opening 11a in the body 11, the boarding ramp 16 are compactly stored in a folded state between the door front side pocket 17 and the door rear side pocket 18 on the inner face of the door 12. Among the components of the folded boarding ramp 16, the lower face (face not stepped on by feet) of the lower step 15 covering the central part of the door 12 and the upper face (face stepped on by feet) of the upper step outer part 13b covering the lower part of the door 12 are seen from the passenger compartment side.

In the stored state of the boarding ramp 16, the window 19 located in the upper part of the door 12 is completely exposed, giving no oppressed feeling to the passengers in the passenger compartment. Also, the lower step 15 covering the inner face of a part of the door 12 lower than the window 19 has a lower face (face not stepped on by feet when getting on and off) opposed to the passenger compartment side, providing no fear that mud or the like adhering thereon smears the clothes of the passengers. Further, if the shape of the lower face of the lower step 15 is finished smoothly along the lines of the door front side pocket 17 and the door rear side pocket 18, the appearance becomes excellent in cooperation with a small protrusion amount of the lower step 15 into the passenger compartment. Furthermore, although the upper face (face stepped on by feet when getting on and off) of the upper step outer part 13b is exposed in the lower part of the door 12, the upper step outer part 13b has a small area and is located at a position close to the floor of the passenger compartment, providing no fear that the passengers have discomfort even if a small amount of mud adheres to the clothes of the passengers.

Moreover, since the door handle 23 and the handrail 52 are stored in a clearance between the door front side pocket 17 and the folded boarding ramp 16, they do not project into the passenger compartment to obstruct or impair the appearance.

When the door handle 23 is lowered down in the direction of Arrow a on the fulcrum pin 22 in FIG. 7 in order to open the fully closed door 12, the door driving link 25 descends in the direction of Arrow b, so that the door 12 connected through the fulcrum pin 27 to the door driving link 25 is opened outward in the direction of Arrow c about the hinge line 20. At this time, since the door driving link 25 is relatively rotated in the direction of Arrow d with respect to the door 12, the upper-step driving link 28 is pulled in the direction of Arrow e, so that the upper step inner part 13a is swung in the direction of Arrow f about the fulcrum pin 31. As a result, the upper step outer part 13b is swung in the direction of Arrow g, and the support link 36 is swung in the direction of Arrow h on the fulcrum pin 35, so that the upper step inner part 13a and the upper step outer part 13b which has been folded in the overlapping manner are deployed so as to be located on the same plane.

As is apparent from FIGS. 6 and 7, the intermediate/lower-step driving link 42 is moved in the direction of Arrow i by the support link 36 swinging in the direction of Arrow h, thereby pushing the arm 40a of the first gear 40 to rotate the first gear 40 in the direction of Arrow j, so that the second gear 45 meshed with the first gear 40 is rotated together with the first support shaft 44 in the direction of Arrow k. As a result, the intermediate step 14 fixed to the first support shaft 44 is swung and deployed in the direction of Arrow m. Also, when the first sprocket 47 is rotated together with the first support shaft 44 in the direction of Arrow k, the second sprocket 48 and the second support shaft 46 are rotated in the direction of Arrow n by the endless chain 49, so that the lower step 15 fixed to the second support shaft 46 is swung and deployed in the direction of Arrow o.

As illustrated in FIG. 7, when the door handle 23 is swung in the direction of Arrow a, the handrail driving link 54 is pulled down in the direction of Arrow p, and the handrail 52 is pulled by the handrail driving link 54 and swung in the direction of Arrow q about the fulcrum pin 51 to project out of the opening 11a in the body 11 to the outside of the aircraft.

In this way, when the door 12 reaches the fully opened position shown in FIG. 3, the upper end of the door 12 is lowered and stopped at a position close to the ground, and the lower step 15, the intermediate step 14 and the upper step 13 respectively assume horizontal postures and are diagonally aligned at predetermined pitches, whereby the passengers can getting on and off the aircraft through the opening 11a in the body 11. At this time, the handrail 52 extends diagonally along the alignment direction of the lower step 15, the intermediate step 14 and the upper step 13 so that the passengers going up and down the boarding ramp 16 can easily grab the handrail 52 with one hand.

Since the lower step 15 is formed longer than the upper step 13 and the intermediate step 14, the lower step 15 extends to the upper end of the door 12 while fully covering the window 19 provided in the upper part of the door 12 in the state where the boarding ramp 16 is deployed. Thus, the passengers can step on the lower step 15 without being obstructed by the upper part of the door 12.

Also, since the upper step 13 is divided into two parts, that is, the upper step inner part 13a and the upper step outer part 13b, and folded and stored so that they overlap with each other, the boarding ramp 16 can be made to be stored in a compact manner.

When the door 12 is closed from the fully opened state shown in FIG. 3 through the half opened state shown in FIG. 7 to the fully closed state shown in FIG. 8, the boarding ramp 16 is folded from the deployed state to the stored state through the process in the reverse order of the above-described process. When the passengers are onboard in the aircraft, the door 12 can be opened and closed by operating the door handle 23 from inside the aircraft. When the passengers are not onboard, the door 12 can be directly opened and closed while grabbing the door 12 from outside the aircraft. Also in this case, the boarding ramp 16 is automatically deployed or stored with the opening and closing of the door 12.

The embodiment of the present invention has been described above, but various changes in design can be made to the present invention without departing from the subject matter thereof.

For example, the door 12 is manually opened and closed by operation of the handle 23 in the embodiment, but the door 12 may be opened and closed by an actuator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A boarding ramp device for an aircraft, comprising:
   a door including a window in an upper part, said door being movable to open and close an opening in a body of the aircraft, the door being pivotally supported at a lower part by the body; and
   a foldable boarding ramp being operatively provided on an inner face of the door,
   said ramp including a plurality of plate-shaped steps being pivotally supported on the inner face of the door,
   said plurality of plate-shaped steps being capable of swinging in association with one another between a stored position along the inner face of the door and a deployed position, and
   wherein the steps are folded into the stored position so as not to interfere with the window, and the steps are deployed into the deployed position so as to cover the window.

2. The boarding ramp device for an aircraft according to claim 1, wherein the boarding ramp further includes:
- a door handle pivotally supported by the body;
- a door driving link having one end pivotally supported by the door handle and the other end pivotally supported by the door;
- an upper-step driving link having one end pivotally supported by the door driving link;
- an upper step having one end pivotally supported by the other end of the upper-step driving link and an intermediate part pivotally supported by the lower part of the door;
- a support link having one end pivotally supported by the door and the other end pivotally supported by the upper step;
- an intermediate/lower-step driving link having one end pivotally supported by the support link;
- a first gear rotatably supported at a rotational support point in the door, the other end of the intermediate/lower-step driving link being pivotally supported at a position eccentric from the rotational support point of the first gear;
- an intermediate step pivotally supported by an intermediate part of the door;
- a second gear fixed to a support shaft of the intermediate step and meshed with the first gear;
- a first sprocket fixed to the support shaft of the intermediate step;
- a lower step pivotally supported at a position below a lower end of the window provided in the upper part of the door;
- a second sprocket fixed to a support shaft of the lower step; and
- an endless chain wound around the first and second sprockets.

3. The boarding ramp device for an aircraft according to claim 2, wherein the upper step includes an upper step inner part having one end pivotally supported by the door, and an upper step outer part having one end pivotally supported by the other end of the upper step inner part and the other end pivotally supported by the other end of the support link and the upper step inner part and the upper step outer part are folded so that they are overlapped with each other at the stored position.

4. The boarding ramp device for an aircraft according to claim 1, and further including a door handle operatively connected to said steps for actuating said steps from the stored positioned to the deployed position.

5. The boarding ramp device for an aircraft according to claim 4, and further including a door driving link operatively connected to said door handle and said door for assisting in actuating said steps from the stored positioned to the deployed position.

6. The boarding ramp device for an aircraft according to claim 5, and further including a handrail driving link operatively connected to said door handle and said aircraft for assisting in actuating said steps from the stored positioned to the deployed position.

7. The boarding ramp device for an aircraft according to claim 5, wherein an upper step driving link is operatively connected to said door driving link and said upper step for moving said upper step between a stored position and a deployed position.

8. The boarding ramp device for an aircraft according to claim 7, and further including a support link operatively connected to said upper step and said door for moving said upper step between a stored position and a deployed position.

9. The boarding ramp device for an aircraft according to claim 8, and further including an intermediate/lower step driving link operatively connected to said support link and said intermediate step for moving said intermediate step between a stored position and a deployed position.

10. The boarding ramp device for an aircraft according to claim 9, and further including a chain operatively connected between said intermediate step and said lower step for moving said lower step from a stored position to a deployed position.

11. A boarding ramp device adapted for use with an aircraft, comprising:
- a door including a window in an upper part, said door being adapted to be moved between an opened and closed position relative to an opening in a body of the aircraft, the door being adapted to be pivotally supported at a lower part by the body; and
- a foldable boarding ramp being operatively connected to an inner face of the door,
- said ramp including a plurality of steps being pivotally supported on the inner face of the door,
- said plurality of steps being swingable in association with one another between a stored position aligned along the inner face of the door and a deployed position, and
- wherein the steps are folded into the stored position to not interfere with the window, and the steps are deployed into the deployed position so as to cover the window.

12. The boarding ramp device adapted for use with an aircraft according to claim 11, wherein the boarding ramp further includes:
- a door handle pivotally supported by the body;
- a door driving link having one end pivotally supported by the door handle and the other end pivotally supported by the door;
- an upper-step driving link having one end pivotally supported by the door driving link;
- an upper step having one end pivotally supported by the other end of the upper-step driving link and an intermediate part pivotally supported by the lower part of the door;
- a support link having one end pivotally supported by the door and the other end pivotally supported by the upper step;
- an intermediate/lower-step driving link having one end pivotally supported by the support link;
- a first gear rotatably supported at a rotational support point in the door, the other end of the intermediate/lower-step driving link being pivotally supported at a position eccentric from the rotational support point of the first gear;
- an intermediate step pivotally supported by an intermediate part of the door;
- a second gear fixed to a support shaft of the intermediate step and meshed with the first gear;
- a first sprocket fixed to the support shaft of the intermediate step;
- a lower step pivotally supported at a position below a lower end of the window provided in the upper part of the door;
- a second sprocket fixed to a support shaft of the lower step; and
- an endless chain wound around the first and second sprockets.

13. The boarding ramp device adapted for use with an aircraft according to claim 12, wherein the upper step includes an upper step inner part having one end pivotally supported by the door, and an upper step outer part having one end pivotally supported by the other end of the upper step inner part and the other end pivotally supported by the other end of the support link and the upper step inner part and the upper step outer part are folded so that they are overlapped with each other at the stored position.

14. The boarding ramp device adapted for use with an aircraft according to claim 11, and further including a door handle operatively connected to said steps for actuating said steps from the stored positioned to the deployed position.

15. The boarding ramp device adapted for use with an aircraft according to claim 14, and further including a door driving link operatively connected to said door handle and said door for assisting in actuating said steps from the stored positioned to the deployed position.

16. The boarding ramp device adapted for use with an aircraft according to claim 15, and further including a handrail driving link operatively connected to said door handle and said aircraft for assisting in actuating said steps from the stored positioned to the deployed position.

17. The boarding ramp device adapted for use with an aircraft according to claim 15, wherein an upper step driving link is operatively connected to said door driving link and said upper step for moving said upper step between a stored position and a deployed position.

18. The boarding ramp device adapted for use with an aircraft according to claim 17, and further including a support link operatively connected to said upper step and said door for moving said upper step between a stored position and a deployed position.

19. The boarding ramp device adapted for use with an aircraft according to claim 18, and further including an intermediate/lower step driving link operatively connected to said support link and said intermediate step for moving said intermediate step between a stored position and a deployed position.

20. The boarding ramp device adapted for use with an aircraft according to claim 19, and further including a chain operatively connected between said intermediate step and said lower step for moving said lower step from a stored position to a deployed position.

* * * * *